(12) United States Patent
Pan et al.

(10) Patent No.: US 11,171,597 B2
(45) Date of Patent: Nov. 9, 2021

(54) WIND-SOLAR HYBRID POWER PLANT

(71) Applicant: ABB Schweiz AG, Baden (CH)

(72) Inventors: Jiuping Pan, Raleigh, NC (US); Peter Steimer, Ehrendingen (CH)

(73) Assignee: ABB Schweiz AG, Baden (CH)

( * ) Notice: Subject to any disclaimer, the term of this patent is extended or adjusted under 35 U.S.C. 154(b) by 226 days.

(21) Appl. No.: 16/036,159

(22) Filed: Jul. 16, 2018

(65) Prior Publication Data

US 2020/0021236 A1    Jan. 16, 2020

(51) Int. Cl.

| | |
|---|---|
| H02S 10/12 | (2014.01) |
| H02S 40/32 | (2014.01) |
| H02S 40/38 | (2014.01) |
| F03D 9/11 | (2016.01) |
| F03D 9/25 | (2016.01) |
| F03D 9/00 | (2016.01) |
| H02J 3/38 | (2006.01) |
| H02J 7/00 | (2006.01) |

(52) U.S. Cl.
CPC .............. H02S 10/12 (2014.12); F03D 9/007 (2013.01); F03D 9/11 (2016.05); F03D 9/255 (2017.02); H02J 3/385 (2013.01); H02J 3/386 (2013.01); H02J 7/0068 (2013.01); H02S 40/32 (2014.12); H02S 40/38 (2014.12); F05B 2220/30 (2013.01); F05B 2220/708 (2013.01); F05B 2220/70646 (2013.01)

(58) Field of Classification Search
CPC .................................. H02S 10/12; H02J 7/00
See application file for complete search history.

(56) References Cited

U.S. PATENT DOCUMENTS

| | | | |
|---|---|---|---|
| 8,232,681 B2* | 7/2012 | Lopez | ...................... H02J 1/10 |
| | | | 307/86 |
| 8,710,350 B2 | 4/2014 | Shufflebotham | |

(Continued)

FOREIGN PATENT DOCUMENTS

| | | |
|---|---|---|
| WO | 2017027563 A1 | 2/2017 |
| WO | 2018093593 A1 | 5/2018 |

(Continued)

OTHER PUBLICATIONS

European Patent Office, Extended European Search Report, in corresponding application No. 19186037.8, dated Nov. 26, 2019, 9 pp.

(Continued)

*Primary Examiner* — Hal Kaplan
*Assistant Examiner* — Joseph N Inge
(74) *Attorney, Agent, or Firm* — Greenberg Traurig, LLP (57) ABSTRACT

Unique systems, methods, techniques and apparatuses of hybrid power plants are disclosed. One exemplary embodiment is a hybrid power plant system including a plurality of hybrid generation units each including an AC collection bus, an AC power source, an AC-AC power converter coupled to the AC power source and AC collection bus, a DC power source, a DC-AC converter coupled to the DC power source and the AC collection bus, an energy storage device, and a power transformer coupled to the AC collection bus and structured to receive AC power from the AC collection bus, step up a voltage of the received AC power, and output medium voltage AC (MVAC) power.

25 Claims, 7 Drawing Sheets

(56) References Cited

U.S. PATENT DOCUMENTS

| | | |
|---|---|---|
| 9,130,387 B2 | 9/2015 | Dong et al. |
| 2012/0323396 A1* | 12/2012 | Shelton ................ H02J 3/381 |
| | | 700/297 |
| 2016/0099572 A1 | 4/2016 | Gupta et al. |
| 2017/0045035 A1* | 2/2017 | Das ....................... H02H 9/041 |
| 2017/0358929 A1* | 12/2017 | Koeppe .............. H02J 13/0096 |
| 2018/0048157 A1 | 2/2018 | Kolwalkar et al. |
| 2018/0195495 A1* | 7/2018 | Williams ................. F03D 9/11 |

FOREIGN PATENT DOCUMENTS

| | | | | |
|---|---|---|---|---|
| WO | WO-2018093593 A1 * | 5/2018 | ............... | H02J 3/46 |
| WO | 2018128731 A1 | 7/2018 | | |

OTHER PUBLICATIONS

D. T. R. Challa et al., "An inverter fed with combined wind-solar energy system using CUK-SEPIC converter," International Journal of Engineering Research and Technology (IJERT), dated Nov. 2012, pp. 1-8, vol. 1, No. 9, ESRSA Publication Pvt. Ltd., Gujarat, India.

D. Gowtham et al., "Hybrid distributed power generation system using PV and wind energy," International Journal of Computer Applications, Proceedings on National Conference Potential Research Avenues and Future Opportunities in Electrical and Instrumentation Engineering, dated Jul. 2014, pp. 10-15, IJCA Journal, New York, USA.

M. Huang et al., "improved control of small-scale wind-solar hybrid grid-connected inverter," Power Electronics, dated Mar. 2016, 8 pages, vol. 50, No. 3, China Academic Journal Electronic Publishing House, China.

* cited by examiner

WIND-SOLAR HYBRID POWER PLANT

BACKGROUND

The present disclosure relates generally to hybrid power plants using multiple energy sources. For large-scale power plants, wind generation systems and solar generation systems can be combined to complement each other since each system operates at peak energy production during different times of the day. Conventional hybrid power plants combine wind generation systems, such as wind turbines, and solar generation systems, such as photovoltaic (PV) panel arrays, using DC integration. Power output from the different generation systems is converted to DC power and combined on a common DC bus. Existing hybrid power plants suffer from a number of shortcomings and disadvantages. There remain unmet needs including increasing power plant reliability, reducing hardware cost, and increasing plant capability for response to power grid conditions, such as frequency abnormalities. For instance, hybrid power plants using a single, high capacity inverter to convert combined DC power from the common DC bus to the AC power for the utility grid creating the potential for a single point failure to take multiple generation systems offline. Additionally, the sole inverter of a DC integrated hybrid power plant must be oversized to provide required reactive power support, and may not be suitable for upgrading of wind power plants with additional solar PV capacity or upgrading of solar PV power plants with additional wind capacity. There is a significant need for the unique apparatuses, methods, systems and techniques disclosed herein.

DISCLOSURE OF ILLUSTRATIVE EMBODIMENTS

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

SUMMARY

Exemplary embodiments include unique systems, methods, techniques and apparatuses for hybrid power plants. Further embodiments, forms, objects, features, advantages, aspects and benefits of the disclosure shall become apparent from the following description and drawings.

DETAILED DESCRIPTION OF ILLUSTRATIVE EMBODIMENTS

Figure 1:
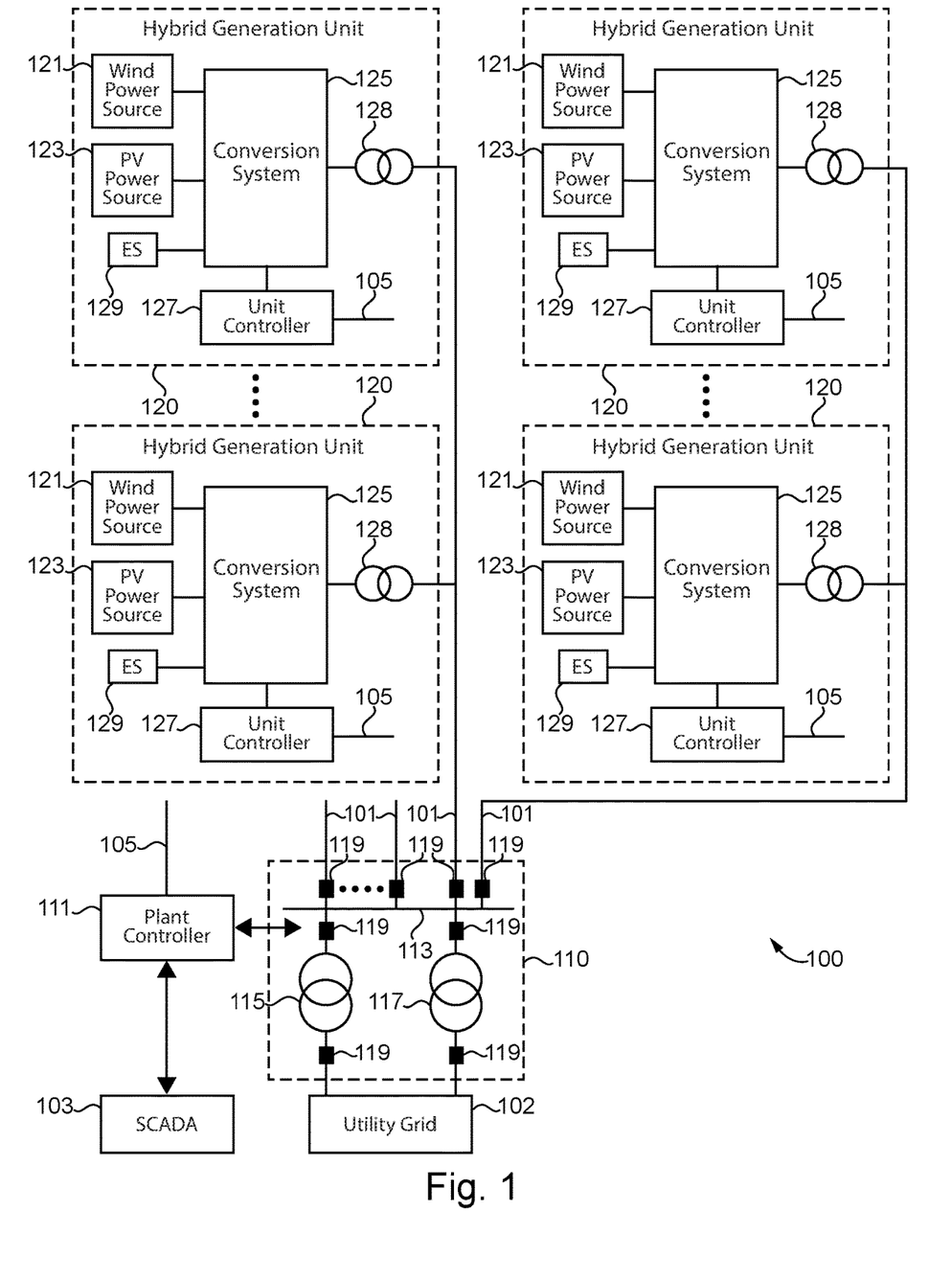
FIG. 1 illustrates an exemplary hybrid power plant.

With reference to FIG. 1, there is illustrated an exemplary hybrid power plant 100 structured to generate power from a plurality of AC and DC power sources, convert the received power to medium voltage alternating current (MVAC) power, and output high voltage alternating current (HVAC) power to a utility grid 102. In certain embodiments, low voltage is a voltage less than 1000 V, medium voltage is a voltage between 1000 V and 100 kV, and high voltage is a voltage greater than 100 kV. It shall be appreciated that the topology of power plant 100 is illustrated for the purpose of explanation and is not intended as a limitation of the present disclosure. For example, power plant 100 may include feeder lines arranged in a ring configuration, more or fewer feeder lines, and more or fewer step up transformers in the grid connection substation, to name but a few examples. Although power plant 100 is illustrated with a single line diagram, power plant 100 may be structured to transmit multiphase power.

Power plant 100 includes a grid connection substation 110 coupled between utility grid 102 and a plurality of feeder lines 101. Feeder lines 101 are structured to receive MVAC power and transmit the MVAC power to substation 110. In certain embodiments, the MVAC power has a nominal voltage in the range of 33-36 kV and each feeder line has a power capacity in the range of 30-40 MW. Substation 110 is structured to receive MVAC power from the plurality of feeder lines 101, step up the voltage of the received MVAC power using power transformers 115 and 117, and output HVAC power to utility grid 102. Substation 110 includes a main AC bus 113 coupled between the plurality of feeder lines 101 and transformers 115 and 117. Substation 110 also includes a plurality of protective devices 119 structured to detect and respond to faults within power plant 100. The plurality of protective devices 119 may include circuit breakers, protective relays, or sensors, to name but a few examples.

Power plant 100 includes a plurality of hybrid generation units 120, each unit being coupled to one of the plurality of feeder lines 101. Each hybrid generation unit 120 includes a wind power source 121, a photovoltaic (PV) power source 123, and an energy storage device 129, each coupled to a power conversion system 125. In certain embodiments, one or more hybrid generation units 120 may not include an energy storage device 129. In certain embodiments, wind power source 121 may be replaced with a plurality of wind power sources or another type of AC power source. In certain embodiments, PV power source 123 may be replaced by another type of DC power source.

Wind power source 121 is structured to convert kinetic energy, generated as a result of wind, into low voltage alternating current (LVAC) power or medium voltage alternating current (MVAC) power. In certain embodiments, wind power source 121 includes a wind turbine having a rotating shaft coupled to a generator. Wind power source 121 outputs the generated AC power to conversion system 125.

PV power source 123 is structured to convert solar energy into low voltage direct current (LVDC) power or medium voltage direct current (MVDC) power. In certain embodiments, PV power source 123 is a solar panel array including a plurality of solar panels coupled in series and/or in parallel.

PV power source 123 is structured to output the generated DC power to conversion system 125.

Energy storage device 129 is structured to receive DC power from conversion system 125, store the received DC power, and output the stored DC power to conversion system 125. Energy storage device 129 may be a battery, a battery bank, a capacitor, an ultracapacitor, or a capacitor bank, to name but a few examples. In another embodiment, energy storage device 129 may be a flywheel structured to receive, store, and output AC power.

Conversion system 125 includes an AC collection bus and a plurality of power converters structured to receive power from wind power source 121, PV power source 123, and energy storage device 129, and output MVAC power to a power transformer 128. Each power converter may include a separate converter controller structured to control one power converter or one or more power converter controller may be incorporated into a unit controller 127 of the hybrid generation unit 120. The AC collection bus is coupled to power transformer 128 and structured to receive AC power from the AC collection bus, step up the voltage of the received AC power, and output AC power with a medium voltage to feeder line 101. The AC power received with transformer 128 may be LVAC power or MVAC power with a voltage less than the voltage of the MVAC power output by the power transformer.

Power plant 100 includes a distributed control system including a plant controller 111 and a plurality of unit controllers 127. Plant controller 111 is structured to communicate with the plurality of unit controllers 127 as well as the control system 103 of a utility grid 102. In the illustrated embodiment, plant controller 111 is structured to communicate with utility grid 102 by way of a supervisory control and data acquisition (SCADA) system 103. Plant controller 111 receives system operator dispatch orders and energy market signals from SCADA system 103. System operator dispatch orders include active power output targets and reactive power output targets for power plant 100. A target may be a reference point or an acceptable range, to name but a few examples. Energy market signals may include look-ahead or real-time electrical energy prices and ancillary service prices for frequency regulation and operating reserves.

Plant controller 111 also receives power plant operational data from devices in power plant 100 including the plurality of unit controllers 127 and sensors located within substation 110. Operational data may include power measurements, voltage measurements, and current measurements from sensors distributed within power plant 100. For example, voltage sensors may be coupled to AC buses, DC buses, and converter terminals, and current sensors may be operatively coupled to feeders in close proximity to AC buses or DC buses.

Using the system operator dispatch orders, energy market signals, and operational data, plant controller 111 generates a set of coordinated instructions, also known as unit orders, structured to operate the controllable devices within power plant 100, such as the conversion system 125 of each hybrid generation unit 120 and other controllable devices located in grid connection substation 110, such as shunt capacitor banks and protective devices 119. The set of coordinated instructions may include switching patterns, on/off commands, and control parameters, to name but a few examples.

Each unit controller 127 is structured to communicate with plant controller 111 by way of communication channel 105, which may be a wired or wireless connection. Each unit controller 127 is structured to operate the conversion system 125 within the same hybrid generation unit 120 based on instructions transmitted from plant controller 111. It shall be appreciated that any or all of the foregoing features of power plant 100 may also be present in the other power plants or power plant components disclosed herein.

Figure 2:
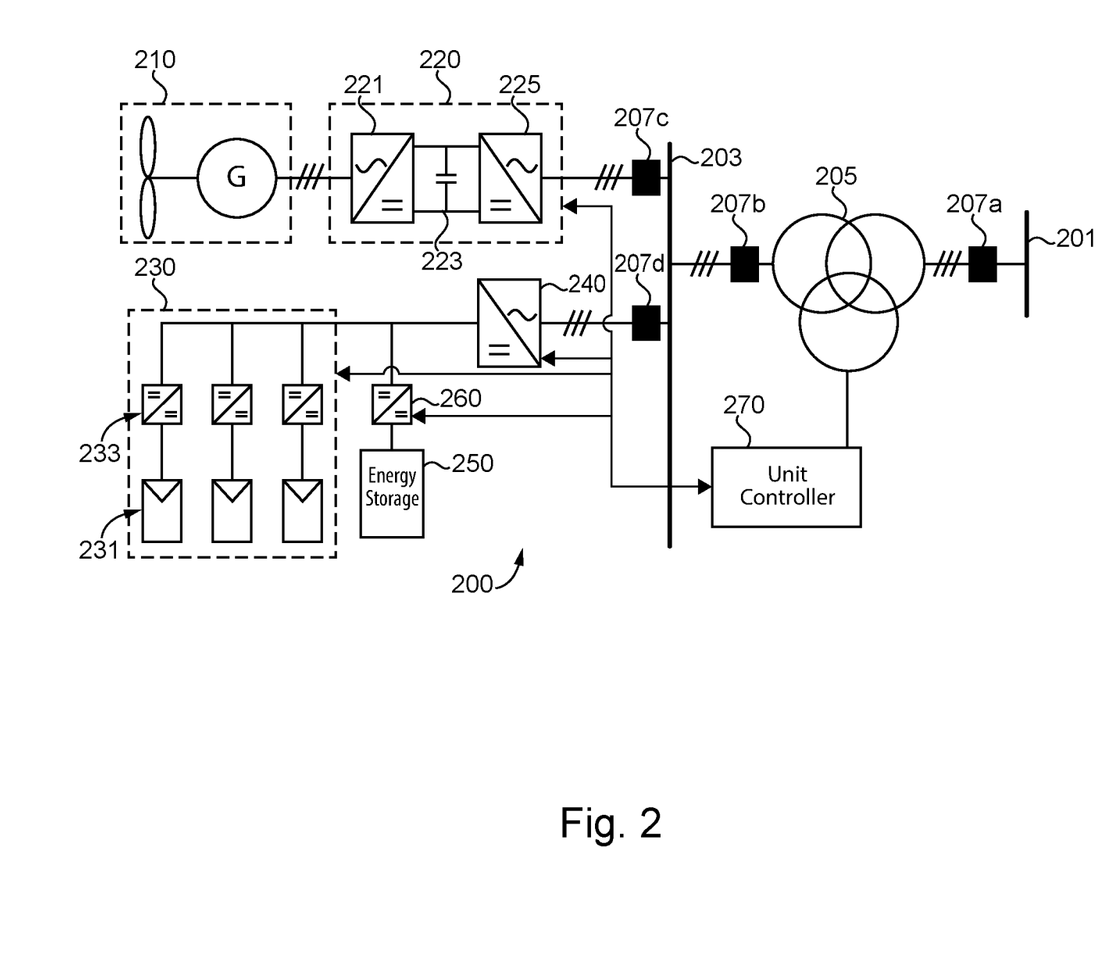
FIG. 2 illustrates one exemplary hybrid generation unit of the exemplary hybrid power plant in FIG. 1.

With reference to FIG. 2 there is illustrated an exemplary hybrid generation unit 200 coupled to a feeder line 201, such as one of the hybrid generation units 120 in FIG. 1. Specifically, hybrid generation unit 200 includes a power transformer 205 having a first winding coupled to feeder line 201, a second winding coupled to an AC collection bus 203, and a third winding coupled to a unit controller 270. Power transformer 205 is structured to receive multiphase AC power from AC collection bus 203, step up the voltage of the received power, and output the received multiphase AC power with the stepped up voltage to feeder line 201. The AC power output to feeder line 201 is MVAC power. In certain embodiments, power transformer 205 receives AC power having a voltage between 600V and 960V, and outputs MVAC power having a voltage of approximately 34.5 kV. In other embodiments, power transformer 205 receives MVAC power having a voltage between 1000V to 3000V, and output MVAC power having a voltage of approximately 34.5 kV In the illustrated embodiment, power transformer 205 is also structured to provide AC auxiliary power to unit controller 270 by way of the third winding. Power transformer 205 may also be structured to provide power to other controllers and equipment of hybrid generation unit 200, such as tracker motors of PV power source 230. In other embodiments, power transformer 205 does not include a third winding, and unit controller 270 receives power from energy storage device 250 or another power source. Energy storage device 250 may also provide power to the converter controllers and unit controller 270 during system startup or system restart.

Hybrid generation unit 200 includes a wind power source 210 including a wind turbine and an electric generator. Wind power source 210 may also include additional components, such as a gearbox. The electric generator receives a rotating force from a shaft of the winding turbine, causing the electric machine to output three-phase AC power. In other embodiments, wind power source 210 may output AC power with any number of phases.

An AC-AC converter 220 is coupled to wind power source 210 and AC collection bus 203. AC-AC converter 220 is structured to receive the AC power output by wind power source 210, convert the received AC power to DC power, convert the DC power to AC power, and output the AC power. AC power received by converter 220 and the AC power output by converter 220 may have a fixed voltage magnitude with a frequency matching the frequency of the utility grid. AC-AC converter 220 includes an AC-DC converter 221, a DC link 223, and a DC-AC converter 225. AC-AC converter 220 is structured to receive AC power from wind power source 210, convert the received AC power to DC power, and output the DC power to DC link 223 in response to receiving control signals from unit controller 270. DC-AC converter 225 is structured to receive DC power from DC link 223, convert the received DC power to three-phase AC power, and output the converted AC power to AC collection bus 203.

Hybrid generation unit 200 includes a PV power source 230 including a plurality of PV panels 231, also known as a PV array, each panel being coupled to one of a plurality of DC-DC optimizers 233, also known as maximum power point tracking converters. The plurality of PV panels 231 is structured to generate DC power and output the generated DC power to the plurality of DC-DC optimizers 233. Each DC-DC optimizer is structured to control the output of one PV panel based on control signals received from unit controller 270. For example, the unit controller 270 may cause a DC-DC optimizer 233 to operate such that the output power of the PV panel is at a maximum power point. In other embodiments, PV power source 230 may include one PV panel or PV panels connected in a single string, multiple strings, or any other combination of parallel and series connections. PV power source 230 may include DC-DC optimizers coupled to more than one PV panel, DC-DC optimizers coupled to a string of PV panels, or PV power source 230 may include no DC-DC optimizers. The plurality of DC-DC optimizers 233 is coupled to a DC-AC converter 240 structured to receive DC power from the plurality of DC-DC optimizers 233, convert the DC power to three-phase AC power, and output the converted AC power to AC collection bus 203 in response to receiving control signals from unit controller 270.

Hybrid generation unit 200 includes an energy storage device 250 coupled to a DC-DC converter 260 and converter 260 is coupled to DC-AC converter 240. Energy storage device 250 is structured to receive DC power from DC-DC converter 260, store the DC power, and output the DC power to DC-DC converter 260 in response to instructions from unit controller 270. DC-DC converter 260 is structured to receive DC power from energy storage device 250, step up or step down the voltage of the received power, output the converted DC power to DC-AC converter 240, receive DC power from DC-AC converter 240 or DC-DC optimizers 233, step up or step down the voltage of the received DC power, and output the converted DC power to energy storage device 250. In certain embodiments, energy storage device 250 may be charged using power received from a utility grid, another hybrid generation unit within a hybrid power plant, or one of the power sources of hybrid generation unit 200.

Hybrid generation unit 200 includes a plurality of protective devices 207a-d. Each protective device may include a circuit breaker, a protective relay, a sensor, or any type of device structured to measure electrical characteristics of hybrid generation unit 200 or control the flow of current within hybrid generation unit 200.

Unit controller 270 is in communication with a converter controller of converter 220, converter 240, the plurality of DC-DC optimizers 233, and converter 260. Controller 270 is structured to operate the converters of hybrid generation unit 200 in response to receiving instructions, also known as control signals, from a plant controller, such as plant controller 111 in FIG. 1. It shall be appreciated that any or all of the foregoing features of hybrid generation unit 200 may also be present in the hybrid generation units disclosed herein.

Figure 3:
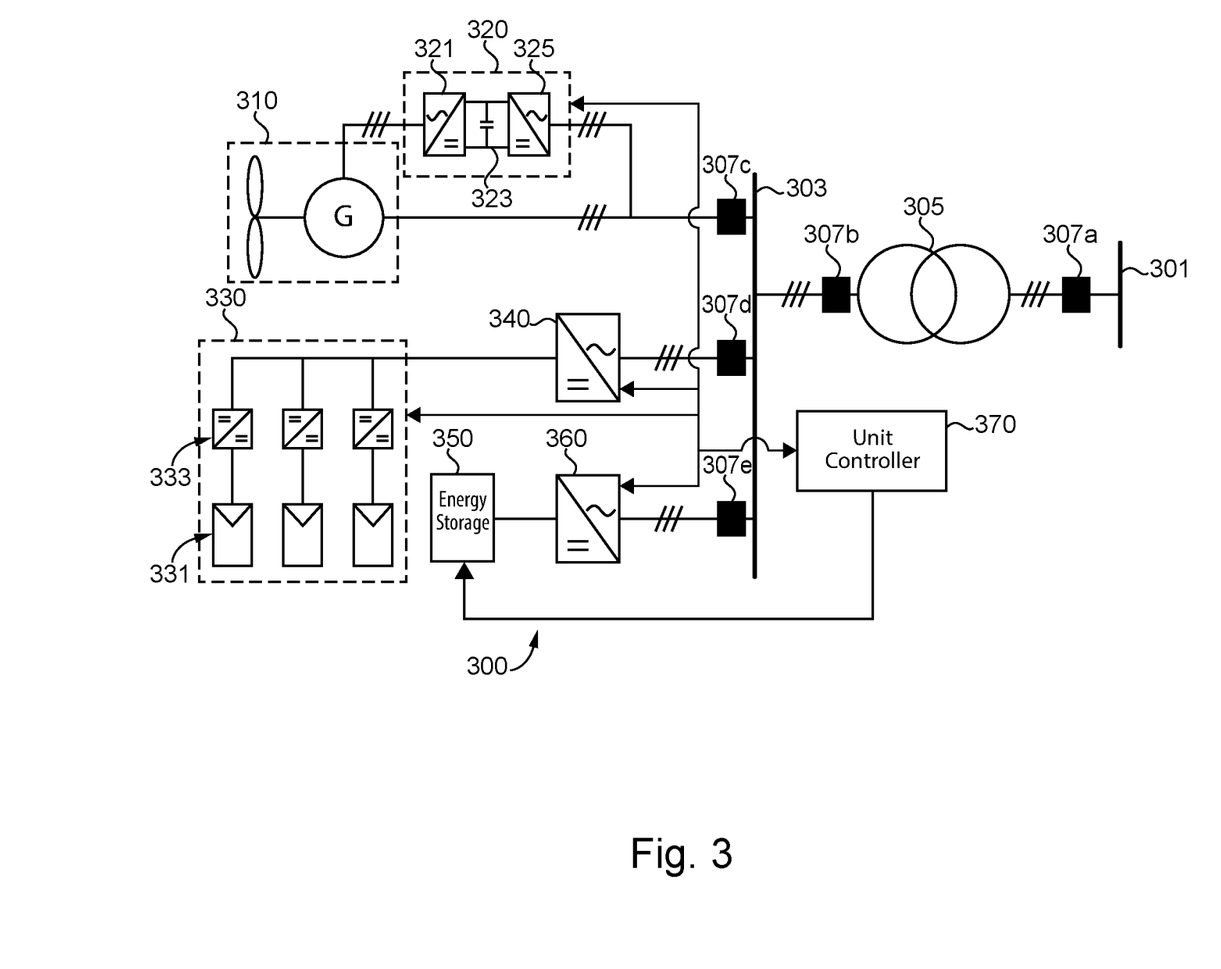
FIG. 3 illustrates another exemplary hybrid generation unit of the exemplary hybrid power plant in FIG. 1.

With reference to FIG. 3 there is illustrated an exemplary hybrid generation unit 300 coupled to a feeder line 301, such as one of the hybrid generation units of power plant 100 in FIG. 1. Hybrid generation unit 300 includes a power transformer 305 having a first winding coupled to feeder line 301 and a second winding coupled to AC collection bus 303. Hybrid generation unit 300 includes a wind power source 310 coupled to AC collection bus 303 and AC-AC converter 320. Wind power source 310 includes a wind turbine and a doubly fed inductive generator (DFIG). AC-AC converter 320 includes an AC-DC converter 321, a DC link 323, and a DC-AC converter 325.

Hybrid generation unit 300 includes a PV power source 330 including a plurality of PV panels 331 coupled to a plurality of DC-DC optimizers 333. A DC-AC converter 340 is coupled to the plurality of DC-DC optimizers 333 and AC collection bus 303.

Hybrid generation unit 300 includes an energy storage device 350 coupled to a DC-AC converter 360. Energy storage device 350 is structured to act as a power supply to unit controller 370. Unit controller 370 is structured to operate converter 320, converter 340, converter 360, and DC-DC optimizers 333 using instructions received from a plant controller. Hybrid generation unit 300 includes a plurality of protective devices 307a-e. It shall be appreciated that any or all of the foregoing features of hybrid generation unit 300 may also be present in the hybrid generation units disclosed herein.

Figure 4:
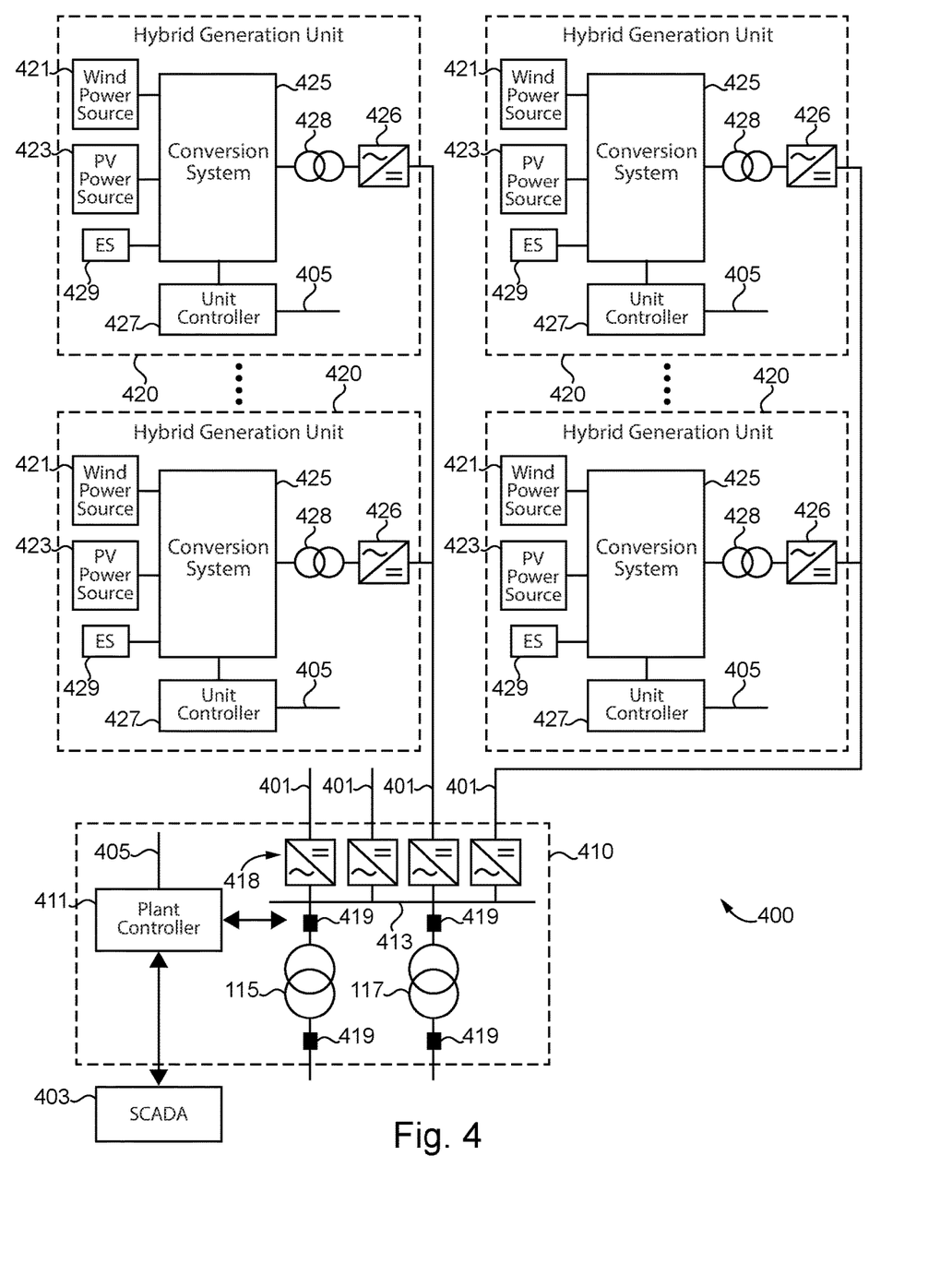
FIG. 4 illustrates another exemplary hybrid power plant.

With reference to FIG. 4 there is illustrated an exemplary power plant 400 including a plurality of hybrid generation units 420 coupled to a substation 410 by way of a plurality of DC feeder lines 401. In certain embodiments where hybrid generation units 420 are distributed over a large area, DC power transmission from each hybrid generation unit 420 to substation 410 may reduce power plant losses compared to AC power transmission.

Each hybrid generation unit includes a wind power source 421, a PV power source 423, and an energy storage device 429 coupled to a conversion system 425. Each hybrid generation unit 420 also includes a transformer 428 coupled to conversion system 425, and an AC-DC converter 426 coupled to transformer 428 and a feeder line of the plurality of feeder lines 401. In certain embodiments, AC-DC converter 426 is a passive converter, such as a diode rectifier, to name but one example. AC-DC converter 426 is structured to receive MVAC power from transformer 428, convert the received MVAC power to MVDC power, and output the converted MVDC power to the coupled feeder line 401.

Power plant 400 includes a grid connection substation 410 coupled between the plurality of hybrid generation units 420 and a utility grid. Substation 410 includes a plurality of DC-AC converters 418, each DC-AC converter being coupled to one feeder line 401 and structured to receive MVDC power from the feeder line, convert the MVDC power to MVAC power, and output the MVAC power to main AC bus 413. The utility grid is coupled to main AC bus 413 by way of transformers 115 and 117 which are structured to receive MVAC power, step up the voltage of the MVAC power, and output HVAC power to the utility grid. Substation 410 also includes a plurality of protective devices 419.

Power plant 400 is controlled by a distributed power plant control system including a plant controller 411 and a plurality of unit controllers 427, each unit controller being associated with one hybrid generation unit 420. Plant controller 411 is structured to receive dispatch orders and other data from a utility grid control system 403, generate a set of coordinated instructions using the received dispatch order and data, and transmit the coordinated instructions to each unit controller 427 using communication channel 405. It shall be appreciated that any or all of the foregoing features of hybrid power plant 400 may also be present in hybrid power plants disclosed herein.

Figure 5:
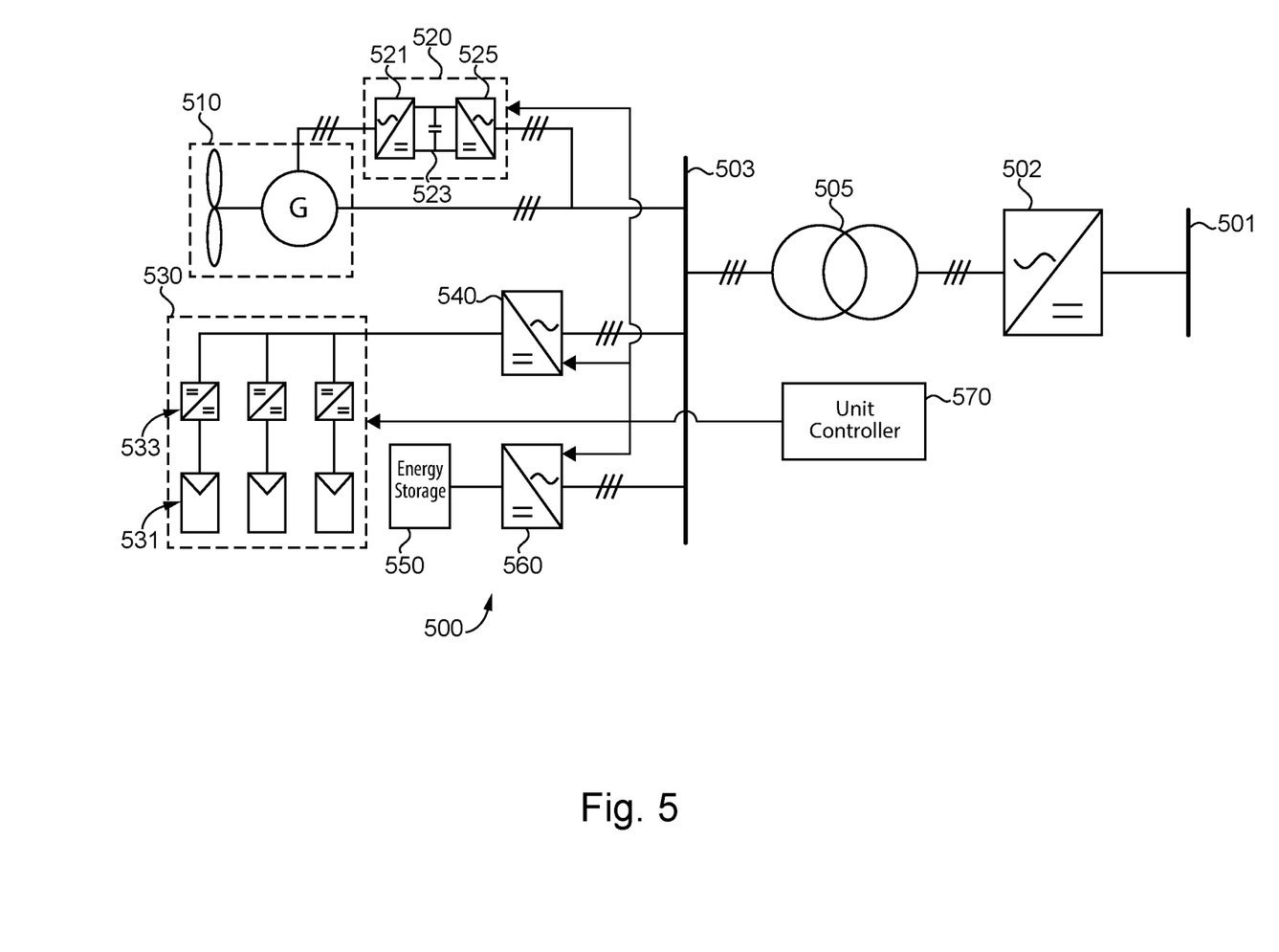
FIG. 5 illustrates an exemplary hybrid generation unit of the exemplary hybrid power plant in FIG. 4.

With reference to FIG. 5 there is illustrated an exemplary hybrid generation unit 500 of an exemplary hybrid power plant, such as power plant 400 in FIG. 4. Unit 500 is coupled to a feeder line 501. Specifically, unit 500 includes an AC-DC converter 502, also known as a rectifier, coupled between a power transformer 505 and feeder line 501. The AC-DC converter 502 may be configured for unidirectional or bidirectional power flow. Power transformer 505 includes a first winding coupled to AC-DC converter 502 and a second winding coupled to AC collection bus 503. Unit 500 includes a wind power source 510 coupled to DC bus 503 and AC-AC converter 520. Wind power source 510 includes a wind turbine and a doubly fed inductive generator (DFIG). AC-AC converter 520 includes an AC-DC converter 521, a DC link 523, and a DC-AC converter 525.

Unit 500 includes a PV power source 530 including a plurality of PV panels 531 coupled to a plurality of DC-DC optimizers 533. A DC-AC converter 540 is coupled to the plurality of DC-DC optimizers.

Unit 500 includes an energy storage device 550 coupled to AC collection bus 503 by way of a DC-AC converter 560. A unit controller 570 is structured to receive instructions from a plant controller and transmit instructions to converter controllers of converter 520, converter 540, converter 560, and DC-DC optimizers 533. It shall be appreciated that any or all of the foregoing features of hybrid generation unit 500 may also be present in the hybrid generation units disclosed herein.

Figure 6:
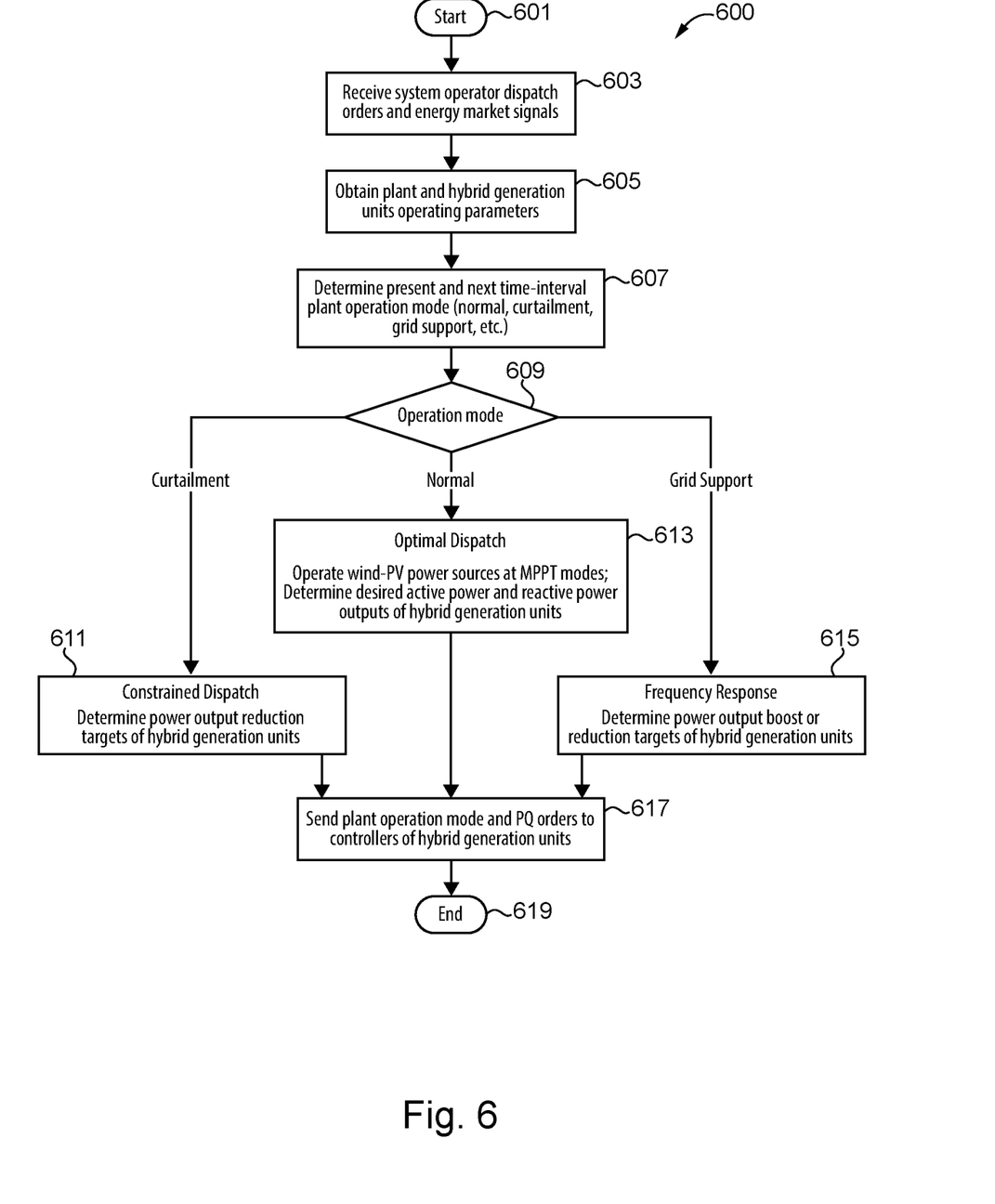
FIGS. 6-7 are flowcharts illustrating exemplary hybrid power plant control processes.

With reference to FIG. 6, there is illustrated an exemplary process 600 for operating a plant controller of an exemplary hybrid power plant. The following description of process 600 is made with reference to power plant 100 illustrated in FIG. 1. It is to be understood, however, that process 600 may be used in combination with other forms of power plants, such as those described above with reference to FIG. 4.

Process 600 begins at start operation 601 and proceeds to operation 603 where plant controller 111 receives system operator dispatch orders and energy market signals from a utility grid control system. The information received from the utility grid control system may include information concerning a present time interval and a future time interval.

Process 600 proceeds to operation 605 where plant controller 111 receives operational data from the unit controllers 127 of the plurality of hybrid generation units 120 and sensors of substation 110. The operational data may include sensor measurements of electrical characteristics of each hybrid generation unit and device statuses for power sources or protective devices within the hybrid generation unit.

Process 600 proceeds to operation 607 where plant controller 111 determines a plant operation mode for the present time interval and/or a future time interval using the information received from the utility grid control system and the operational data from the unit controllers 127. The selected operation mode may include a normal operation mode which prioritizes maximum power output from each hybrid generation unit 120, a curtailment mode which limits the aggregate output power of power plant 100, or a grid support mode in which each controllable device of power plant 100 is controlled so as to correct a frequency abnormality detected at the grid connection substation 110. For example, a utility grid with high penetration of wind and solar generation systems may experience a change in frequency caused by the sudden outage of a coal or nuclear power plant. Plant 100 is structured to respond to the change in frequency in order to avoid system frequency collapse or frequency load shedding events.

Process 600 proceeds to conditional 609 where plant controller 111 selects one of three operation modes. If plant controller 111 selects curtailment mode, process 600 proceeds to operation 611. If plant controller 111 selects normal operation mode, process 600 proceeds to operation 613. If plant controller 111 selects grid support mode, process 600 proceeds to operation 615.

During operation 611 in curtailment mode, plant controller 111 determines output reduction targets for each hybrid generation unit so as to reduce the combined power output of power plant 100 to a power output target. Plant controller 111 may determine the output reduction targets using the system operator dispatch order or the energy market signals. For example, plant controller 111 may determine the power output target in curtailment mode based on the price of power for the current and/or future interval, or plant controller 111 may determine the power output target in curtailment mode based on a request by the utility grid to reduce excess power supplied to the utility grid.

Plant controller 111 generates instructions for each unit controller 127 based on the reduction targets for each hybrid generation unit. In certain embodiments, plant controller 111 may generate instructions so as to reduce power output from a portion of hybrid generation units 120 instead of reducing power output from all hybrid generation units. The instructions may include an active power output target and a reactive power output target. It shall be understood that the output targets may be reference points or acceptable ranges of values. Process 600 proceeds to operation 617 where plant controller 111 distributes the instructions for each unit controller 127 using communication channel 105.

During operation 613 in normal operation mode, plant controller 111 determines output power targets for each hybrid generation unit 120 so as to allow each power source of power plant 100 to operate at maximum power output, also called maximum power point. Plant controller 111 generates instructions for each unit controller 127 including an active power output target and a reactive power output target. Active power output targets may be determined using the energy market signals, system operator dispatch orders, and past active power output targets. For example, plant controller 111 may determine an active power output based on the previous active power output target and power smooth control or ramp rate control to ensure stable and predictable energy from power plant 100. Reactive power output targets may be determined so as to maintain a voltage profile of power plant 100 and in response to a power plant reactive power output target of the system operator dispatch order. Process 600 proceeds from operation 613 to operation 617 where plant controller 111 distributes the instructions for each unit controller 127 using communication channel 105.

During operation 615 in grid support mode, plant controller 111 regulates the power output to the utility grid in order to stabilize the frequency of utility grid 102 under frequency disturbance conditions or maintain the frequency of utility grid 102 within an allowed variation range. Plant controller 111 generates instructions including an active power output target and a reactive power output target for each of the hybrid generation units using power frequency measurements received from sensors within power plant 100. Process 600 proceeds from operation 615 to operation 617 where plant controller 111 distributes the instructions for each unit controller 127 using communication channel 105.

Process 600 proceeds from operation 617 to end operation 619. It shall be further appreciated that a number of variations and modifications to process 600 are contemplated including, for example, the omission of one or more aspects of process 600, and the addition of further conditionals and operations and/or the reorganization or separation of operations and conditionals into separate processes.

Figure 7:
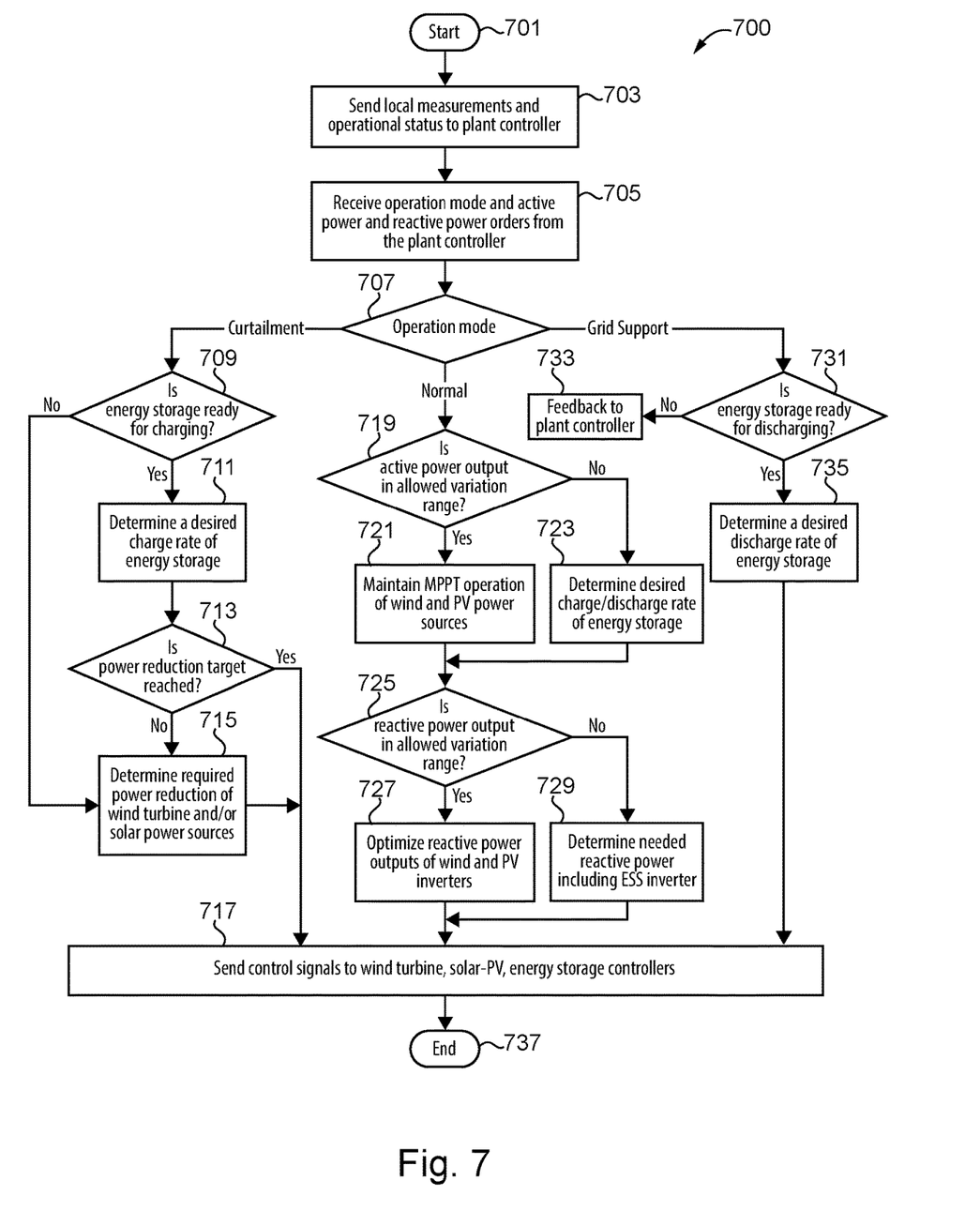

With reference to FIG. 7, there is illustrated an exemplary process 700 for operating a unit controller of an exemplary hybrid power plant. The following description of process 700 is made with reference to hybrid generation unit 200 illustrated in FIG. 2. It is to be understood, however, that process 700 may be used in combination with other forms of hybrid generation units, such as those described above with reference to FIGS. 1 and 3-5.

Process 700 begins at start operation 701 and proceeds to operation 703 where unit controller 270 transmits measurements from the local sensors and device operational statuses to a plant controller, such as plant controller 111 illustrated in FIG. 1. Device operation status may include power output of wind source 210, power output of PV source 230, power output of energy storage device 250, reactive power output from AC-AC converter 220, or reactive power output from DC-AC converter 240, to name but a few examples.

Process 700 proceeds to operation 705 where the unit controller receives instructions from plant controller 111 including active power orders, reactive power orders, and plant operational mode. The active power order includes an active power output target and the reactive power order includes a reactive power output target. Process 700 proceeds to conditional 707 where unit controller 270 enters an operational mode based on the instructions from plant controller 111. If the received instructions indicate curtailment mode, unit controller enters curtailment mode and proceeds to conditional 709. If the received instructions indicate normal operation mode, unit controller 270 enters normal operation mode and proceeds to conditional 719. If the received instructions indicate grid support mode, unit controller 270 enters grid support mode and proceeds to conditional 731.

At conditional 709 in curtailment mode, unit controller 270 determines whether energy storage device 129 is ready for receiving power from the power generation devices of the same hybrid generation unit. The unit controller may determine whether energy storage device 129 is ready for charging by determining the state of charge of energy storage device 129. If energy storage device 129 is not ready for charging, process 600 proceeds to operation 715 where unit controller 270 determines a power reduction target for wind turbine system 210, PV power source 230, or both in order to comply with the instructions received from plant controller 111. Process 700 proceeds to operation 717 where unit controller 270 generates and transmits control signals structured to operate AC-AC converter 220, DC-AC converter 240, and DC-DC optimizers 233 effective to collectively output active and reactive power based on the received active power output target and reactive power output target of the received instructions.

If energy storage device 129 is ready for charging, process 600 proceeds to operation 711 where unit controller 270 determines that charge rate of energy storage device 250. The maximum charge rate is dependent on the current and power ratings of energy storage device 250, but a partial charge rate may be selected in order to comply with the received instructions. The charge rate may be determined in part by user input. Process 700 then proceeds to conditional 713 where unit controller 270 determines whether the charge rate of energy storage device 250 will be sufficient to absorb a portion of the power output by the power sources of hybrid generation unit 200 such that the power output of hybrid generation unit 200 is equal to or less than the active power output target received from plant controller 111. If the charge rate of energy storage device 250 is sufficient, process 700 proceeds to operation 717 where unit controller 270 generates and transmits control signals to AC-AC converter 220, DC-AC converter 240, DC-DC optimizers 233, and DC-DC converter 260 such that hybrid generation unit 200 generates active power in excess of the active power output target, but the difference in power between the generated active power output and the active power output target is absorbed by energy storage device 129.

If the maximum charge rate of energy storage device 250 is not sufficient to meet the target output power, process 700 proceeds to operation 715 where, in addition to energy storage device 250 receiving power from the power sources of hybrid generation unit 200, a reduction in power output from one or both of the power sources is determined. Process 700 then proceeds to operation 717 where unit controller 270 generates and transmits control signals to a AC-AC converter 220, DC-AC converter 240, DC-DC optimizers 233, and DC-DC converter 260 such that hybrid generation unit 200 generates active power in excess of the received active power output target while operating one or more of the power sources below maximum power point and absorbs the difference in power between the generated active power output and the active power output target with the energy storage device 129. Process 700 then proceeds to end operation 737.

At conditional 719 in normal operation mode, unit controller 270 determines whether the active power output of all power sources in hybrid generation unit 200 operating at maximum power point will satisfy the active power output target of the instructions received from plant controller 111. If the active power output target is a range, the active power output satisfies the active power output target by being inside the range. If the active power output target is a reference value, the active power output satisfies the active power output target by being substantially close to the active power output target, such as within 5%, of the active power output target. If the active power output will satisfy the active power output target, process 700 proceeds to operation 721 where unit controller 270 maintains maximum power point tracking operation of both wind power source 210 and PV power source 230. If the active power output will not satisfy the active power output target, process 700 proceeds to operation 723 where unit controller 270 determines a charge or discharge rate of energy storage sufficient for the active power output of hybrid generation unit 200 to satisfy the active power output target.

From operations 721 and 723, process 700 proceeds to conditional 725 where unit controller 270 determines whether the reactive power output of hybrid generation unit 200 will satisfy the reactive power output target of the instructions received from plant controller 111. If the reactive power output is within the range or substantially close to the reference point of the reactive power output target, process 700 proceeds to operation 727 where unit controller 270 optimizes reactive power outputs of wind power source 210 and PV array 231 by equalizing the current from each of converters 220 and 240 in order to reduce power losses. If the reactive power output will not satisfy the reactive power output target, process 700 proceeds from conditional 725 to operation 729 where unit controller 270 determines an amount of reactive power to output using energy storage device 250.

From operations 727 and 729, process 700 proceeds to operation 717 where unit controller 270 generates and transmits control signals to a AC-AC converter 220, DC-AC converter 240, DC-DC optimizers 233, and DC-DC converter 260 so as to operate the power sources of hybrid generation unit 200 at maximum power point and, if necessary, charge or discharge energy storage device 250 to satisfy active power output targets and reactive power output targets. Process 700 then proceeds to end operation 737.

At conditional 731 in grid support mode, unit controller 270 determines whether energy storage device 250 is ready for discharging. If energy storage device 250 is ready for discharging, process 700 proceeds to operation 735 where unit controller 270 determines a discharge rate of energy storage device 250 so as to assist with correcting the detected frequency abnormality in the utility grid. Process 700 then proceeds to operation 717 where unit controller 270 generates and transmits control signals to AC-AC converter 220, DC-AC converter 240, DC-DC optimizers 233, and DC-DC converter 260 so as to discharge energy from energy storage device 250 while operating wind power source 210 and PV power source 230 at maximum power points. Process 700 then proceeds to end operation 737.

If energy storage device 250 is not ready to discharge energy during grid support mode, process 700 proceeds to operation 733 where unit controller 270 notifies plant controller 111. In response, plant controller 111 will send instructions to one or more other hybrid generation units effective to request energy from other energy storage devices be discharged at an increased rate.

It shall be further appreciated that a number of variations and modifications to process 700 are contemplated including, for example, the omission of one or more aspects of process 700, the addition of further conditionals and operations and/or the reorganization or separation of operations and conditionals into separate processes.

Further written description of a number of exemplary embodiments shall now be provided. One embodiment is a hybrid power plant system comprising: a plurality of hybrid generation units each comprising: an AC collection bus, an AC power source, an AC-AC power converter coupled to the AC power source and the AC collection bus, and structured to receive AC power from the AC power source and output AC power to the AC collection bus, a DC power source, a DC-AC converter coupled to the DC power source and the AC collection bus, and structured to receive DC power from the DC power source and output AC power to the AC collection bus, an energy storage device, and a power transformer coupled to the AC collection bus and structured to receive AC power from the AC collection bus, step up a voltage of the received AC power, and output medium voltage AC (MVAC) power.

In certain forms of the foregoing hybrid power plant system, the system comprises a grid connection substation coupled to the plurality of hybrid generation units and structured to receive the MVAC power from the plurality of hybrid generation units, step up the medium voltage of the received MVAC power, and output a high voltage AC power to a utility grid. In certain forms, wherein medium voltage is a voltage greater than or equal to 1000V but less than 100 kV and high voltage is a voltage greater than or equal to 100 kV. In certain forms, each hybrid generation unit of the plurality of hybrid generation units includes a unidirectional rectifier coupled to the power transformer and structured to receive MVAC power from the power transformer, convert the power to medium voltage DC (MVDC) power, and output the MVDC power, and wherein the grid connection substation includes a plurality of DC-AC converters, each DC-AC converter being structured to receive MVDC power, convert the MVDC power to MVAC power, and output the MVAC power. In certain forms, each AC power source includes a wind turbine and a doubly-fed inductive generator, each DC power source includes a photovoltaic panel array, and each energy storage device includes a battery. In certain forms, each hybrid generation unit includes a bidirectional DC-AC converter coupled to the AC collection bus and the energy storage device, and structured to transmit DC power to the energy storage device and transmit AC power to the AC collection bus. In certain forms, the system comprises a control system including: a plant controller; and a plurality of unit controllers, each unit controller being structured to control the AC-AC power converter of one hybrid generation unit, the DC-AC converter of the same hybrid generation unit, and a bidirectional power converter coupled to the energy storage device, wherein the plant controller is structured to receive a set of operational data from each unit controller, receive a dispatch order from a utility grid control system, generate a set of unit orders using the dispatch order and the set of operational data, and transmit a unit order of the set of unit orders to each of the unit controllers. In certain forms, each unit order includes an active power output target, a reactive power output target, and an operational mode. In certain forms, the plant controller is structured to detect a frequency abnormality a utility grid, generate a second set of unit orders in response to detecting the frequency abnormality, and transmit each unit order of the second set of unit orders to one unit controller of the plurality of hybrid generation units, and wherein at least one unit controller is structured to operate one hybrid generation unit so as to discharge energy from the energy storage device to the AC collection bus in response to receiving one order of the second set of unit orders. In certain forms, a first unit controller of the plurality of unit controllers is structured to determine the MVAC power output by one hybrid generation unit should be reduced in response to receiving a unit order from the plant controller, determine charging the energy storage device will not sufficiently reduce the MVAC power output to an active power output target, and generate instructions structured to reduce power output from the AC power source or DC power source and charge the energy storage device in response to determining charging the energy storage device will not reduce the MVAC power output to the active power output target.

Another exemplary embodiment is a method for operating a hybrid power plant comprising: operating a plurality of hybrid generation units using a plurality of unit controllers, each hybrid generation unit comprising an AC collection bus, an AC-AC power converter coupled to the AC collection bus, a DC-AC power converter coupled to the AC collection bus, and a power transformer coupled to the AC collection bus; receiving, with a plant controller, a dispatch order from a utility grid control system and a set of operational data from each unit controller of the plurality of unit controllers; determining, with the plant controller, a plant operation mode using the dispatch orders and the set of operational data; generating, with the plant controller, a set of unit controller orders including an active power order, a reactive power order, and the plant operation mode; transmitting one unit controller order of the set of unit controller orders to each unit controller of the plurality of unit controllers; operating, with each unit controller, the DC-AC power converter and AC-AC power converter of one hybrid generation unit using the received unit controller order so as to output medium voltage power from each hybrid generation unit; receiving, at a grid connection substation, the medium voltage power output by each hybrid generation unit; stepping up the received medium voltage power to high voltage power; and outputting high voltage power to a utility grid.

In certain forms of the foregoing method, operating the DC-AC power converter and AC-AC power converter of one hybrid generation unit so as to output medium voltage power from each hybrid generation unit includes providing AC power to the AC collection bus from the DC-AC power converter and AC-AC power converter, receiving the provided AC power with the power transformer, and stepping up a voltage of the AC power using the power transformer to medium voltage AC power. In certain forms, medium voltage is a voltage greater than or equal to 1000V but less than 100 kV and high voltage is a voltage greater than or equal to 100 kV. In certain forms, each hybrid generation unit of the plurality of hybrid generation units includes a rectifier coupled to the power transformer, wherein operating the DC-AC power converter and AC-AC power converter of one hybrid generation unit so as to output medium voltage power includes receiving AC power from the power transformer, stepping up a voltage of the received power, outputting MVAC with the power transformer, receiving MVAC power from the power transformer with the rectifier, converting the MVAC power to MVDC power, and outputting the MVDC power, wherein the grid connection substation includes a plurality of DC-AC converters, and wherein receiving the medium voltage power output by each hybrid generation unit includes converting, with the plurality of DC-AC converters, the received power to MVAC power. In certain forms, each AC-AC power converter receives AC power from a wind turbine and a doubly-fed inductive generator, and each DC-AC power converter receives DC power from a photovoltaic panel array. In certain forms, one hybrid generation unit includes a bidirectional DC-AC converter coupled to the AC collection bus and an energy storage device, and structured to transmit DC power to the energy storage device and transmit AC power to the AC collection bus. In certain forms, determining the plant operation mode with the plant controller includes using a set of energy market signals. In certain forms, each unit order includes an active power output target, a reactive power output target, and an operational mode. In certain forms, the method comprises detecting, with the plant controller, a frequency abnormality of the utility grid using the set of operational data, generating, with the plant controller, a second set of unit orders in response to detecting the frequency abnormality, transmitting, with the plant controller, each unit order of the second set of unit orders to one unit controller of the plurality of hybrid generation units, operating, with one unit controller, one hybrid generation unit so as to discharge energy from an energy storage device to the AC collection bus in response to receiving one order of the second set of unit orders. In certain forms, the method comprises determining, with the unit controller, the medium voltage power output by one hybrid generation unit should be reduced in response to receiving a unit order from the plant controller, determining charging an energy storage device will not reduce the MVAC power output to an active power output target, and reducing active power output from the AC-AC power converter or DC-AC power converter while charging the energy storage device in response to determining charging the energy storage device will not reduce the MVAC power output to the active power output target. In certain forms, operating the DC-AC power converter and AC-AC power converter of one hybrid generation unit includes outputting medium voltage power to the AC collection bus with the AC-AC power converter.

It is contemplated that the various aspects, features, processes, and operations from the various embodiments may be used in any of the other embodiments unless expressly stated to the contrary. Certain operations illustrated may be implemented by a computer executing a computer program product on a non-transient, computer-readable storage medium, where the computer program product includes instructions causing the computer to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described, and that all changes and modifications that come within the spirit of the present disclosure are desired to be protected. It should be understood that while the use of words such as "preferable," "preferably," "preferred" or "more preferred" utilized in the description above indicate that the feature so described may be more desirable, it nonetheless may not be necessary, and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with, or a connection to, another item, as well as a belonging to, or a connection with, the other item as informed by the context in which it is used. The terms "coupled to," "coupled with" and the like include indirect connection and coupling, and further include but do not require a direct coupling or connection unless expressly indicated to the contrary. When the language "at least a portion" and/or "a portion" is used, the item can include a portion and/or the entire item unless specifically stated to the contrary.

What is claimed is:

1. A hybrid power plant system comprising:
   a plurality of hybrid generation units each comprising:
      an AC collection bus,
      an AC power source,
      an AC-AC power converter including a first DC-AC converter, the AC-AC power converter being coupled to the AC power source and the AC collection bus, and structured to receive a generated AC power from the AC power source and output a first AC power to the AC collection bus,
      a DC power source,
      a second DC-AC converter coupled to the DC power source and the AC collection bus, and structured to receive DC power from the DC power source and output a second AC power to the AC collection bus,
      an energy storage device, and
      a power transformer coupled to the AC collection bus and structured to receive a combined AC power including the first AC power and the second AC power from the AC collection bus, step up a voltage of the received combined AC power, and output medium voltage AC (MVAC) power;
   a plurality of unit controllers each configured and operable to select an operating mode of a respective one of the plurality of hybrid generation units from among a normal mode, a curtailment mode, and a grid support mode in response to an instruction sent by a plant controller, wherein, in the curtailment mode, each unit controller is configured and operable to charge the energy storage device of its respective hybrid generation unit subject to determination by the unit controller of a readiness of the energy storage device for charging, and in the grid support mode, each unit controller is configured and operable to discharge the energy storage device of its respective hybrid generation unit subject to determination by the unit controller of a readiness of the energy storage device for discharging.

2. The hybrid power plant system of claim 1 comprising a grid connection substation coupled to the plurality of hybrid generation units and structured to receive power from the plurality of hybrid generation units, and output a high voltage AC power to a utility grid.

3. The hybrid power plant system of claim 2 wherein medium voltage is a voltage greater than or equal to 1000V but less than 100 kV and high voltage is a voltage greater than or equal to 100 kV.

4. The hybrid power plant system of claim 2, wherein each hybrid generation unit of the plurality of hybrid generation units includes a unidirectional rectifier coupled to the power transformer and structured to receive the first MVAC power from the power transformer, convert the first MVAC power to medium voltage DC (MVDC) power, and output the MVDC power, and
wherein the grid connection substation includes a plurality of DC-AC converters, each DC-AC converter being structured to receive the MVDC power from the plurality of hybrid generation units, convert the MVDC power to a second MVAC power, and output the second MVAC power.

5. The hybrid power plant system of claim 1 wherein each AC power source includes a wind turbine and a doubly-fed inductive generator, each DC power source includes a photovoltaic panel array, and each energy storage device includes a battery.

6. The hybrid power plant system of claim 1 wherein each hybrid generation unit includes a bidirectional DC-AC converter coupled to the AC collection bus and the energy storage device, and structured to transmit DC power to the energy storage device and transmit AC power to the AC collection bus.

7. The hybrid power plant system of claim 1 comprising a control system including:
a plant controller configured and operable to receive a set of operational data from each unit controller, receive a dispatch order from a utility grid control system, generate a set of unit orders using the dispatch order and the set of operational data, and transmit a unit order of the set of unit orders to each of the unit controllers.

8. The hybrid power plant system of claim 7 wherein each unit order includes an active power output target, a reactive power output target, and an operational mode.

9. The hybrid power plant system of claim 7 wherein the plant controller is structured to detect a frequency abnormality a utility grid, generate a second set of unit orders in response to detecting the frequency abnormality, and transmit each unit order of the second set of unit orders to one unit controller of the plurality of hybrid generation units, and wherein at least one unit controller is structured to operate one hybrid generation unit so as to discharge energy from the energy storage device to the AC collection bus in response to receiving one order of the second set of unit orders.

10. The hybrid power plant system of claim 7 wherein a first unit controller of the plurality of unit controllers is structured to determine the MVAC power output by one hybrid generation unit should be reduced in response to receiving a unit order from the plant controller, determine charging the energy storage device will not sufficiently reduce the MVAC power output to an active power output target, and generate instructions structured to reduce power output from the AC power source or DC power source and charge the energy storage device in response to determining charging the energy storage device will not reduce the MVAC power output to the active power output target.

11. The system of claim 1, wherein the energy storage device is configured and operable to charge from and discharge to the AC collection bus via a third DC-AC converter and the unit controller is configured and operable to charge and discharge the energy storage device by controlling the third DC-AC converter.

12. The system of claim 1, wherein each energy storage device is configured and operable to charge from and discharge to the AC collection bus via a respective second DC-AC converter of its respective hybrid generation unit and the unit controller is configured and operable to charge and discharge the energy storage device by controlling the second DC-AC converter.

13. The system of claim 1 wherein, in the normal mode, the unit controller is configured and operable to selectably charge and discharge the energy storage device in response to an active power output being outside an allowed variation range.

14. The system of claim 1 wherein the readiness of the energy storage device for charging and the readiness of the energy storage device for discharging are based at least in part on a state of charge condition of the energy storage device.

15. A method for operating a hybrid power plant comprising:
operating a plurality of hybrid generation units using a plurality of unit controllers, each hybrid generation unit comprising an AC collection bus, an AC-AC power converter coupled to the AC collection bus and including a first DC-AC power converter, a second DC-AC power converter coupled to the AC collection bus, and a power transformer coupled to the AC collection bus;
receiving, with a plant controller, a dispatch order from a utility grid control system and a set of operational data from each unit controller of the plurality of unit controllers;
determining, with the plant controller, a plant operation mode using the dispatch orders and the set of operational data;
generating, with the plant controller, a set of unit controller orders including an active power order, a reactive power order, and the plant operation mode;
transmitting one unit controller order of the set of unit controller orders to each unit controller of the plurality of unit controllers;
operating, with each unit controller, the second DC-AC power converter and AC-AC power converter of one hybrid generation unit using the received unit controller order so as to output medium voltage power from each hybrid generation unit;
receiving, at a grid connection substation, the medium voltage power output by each hybrid generation unit;
stepping up the received medium voltage power to high voltage power; and
outputting high voltage power to a utility grid;
selecting, with each unit controller, an operating mode of a respective one of the plurality of hybrid generation units from among a normal mode, a curtailment mode, and a grid support mode; and
controlling, with each unit controller, the respective one of the plurality of hybrid generation units to charge the energy storage device in response to a first communication sent by a plant controller and an evaluation by each unit controller of a readiness of its respective energy storage device for charging in the curtailment mode and to discharge the energy storage device in response to a first communication sent by a plant controller and an evaluation by each unit controller of a readiness of its respective energy storage device for discharging in the grid support mode.

16. The method of claim 15 wherein operating the second DC-AC power converter and AC-AC power converter of one hybrid generation unit so as to output medium voltage power from each hybrid generation unit includes providing a combined AC power to the AC collection bus from the second DC-AC power converter and the AC-AC power converter, receiving the provided combined AC power with the power transformer, and stepping up a voltage of the AC power using the power transformer to medium voltage AC (MVAC) power.

17. The method of claim 16 wherein medium voltage is a voltage greater than or equal to 1000V but less than 100 kV and high voltage is a voltage greater than or equal to 100 kV.

18. The method of claim 16 wherein each hybrid generation unit of the plurality of hybrid generation units includes a rectifier coupled to the power transformer,
wherein operating, with each unit controller, the second DC-AC power converter and AC-AC power converter of one hybrid generation unit so as to output medium voltage power includes outputting the first MVAC power with the power transformer, receiving the first MVAC power from the power transformer with the rectifier, converting the first MVAC power to MVDC power with the rectifier, and outputting the MVDC power with the rectifier,
wherein the grid connection substation includes a plurality of DC-AC converters, and
wherein receiving the medium voltage power output by each hybrid generation unit includes receiving the MVDC power output by the plurality of hybrid generation units, and converting, with the plurality of DC-AC converters, the received MVDC power to a second MVAC power.

19. The method of claim 15 wherein each AC-AC power converter receives AC power from a wind turbine and a doubly-fed inductive generator, and each second DC-AC power converter receives DC power from a photovoltaic panel array.

20. The method of claim 15 wherein one hybrid generation unit includes a bidirectional DC-AC converter coupled to the AC collection bus and an energy storage device, and structured to transmit DC power to the energy storage device and transmit AC power to the AC collection bus.

21. The method of claim 15 wherein determining the plant operation mode with the plant controller includes using a set of energy market signals.

22. The method of claim 15 wherein each unit order includes an active power output target, a reactive power output target, and an operational mode.

23. The method of claim 15 comprising:
detecting, with the plant controller, a frequency abnormality of the utility grid using the set of operational data,
generating, with the plant controller, a second set of unit orders in response to detecting the frequency abnormality,
transmitting, with the plant controller, each unit order of the second set of unit orders to one unit controller of the plurality of hybrid generation units,
operating, with one unit controller, one hybrid generation unit so as to discharge energy from an energy storage device to the AC collection bus in response to receiving one order of the second set of unit orders.

24. The method of claim 15 comprising:
determining, with the unit controller, the medium voltage power output by one hybrid generation unit should be reduced in response to receiving a unit order from the plant controller,
determining charging an energy storage device will not reduce the MVAC power output to an active power output target, and
reducing active power output from the AC-AC power converter or second DC-AC power converter while charging the energy storage device in response to determining charging the energy storage device will not reduce the MVAC power output to the active power output target.

25. The method of claim 15 wherein operating the second DC-AC power converter and AC-AC power converter of one hybrid generation unit includes outputting medium voltage power to the AC collection bus with the AC-AC power converter.

* * * * *